(No Model.) 3 Sheets—Sheet 1.
H. D. MAY.
BAND CUTTER AND FEEDER.
No. 529,397. Patented Nov. 20, 1894.
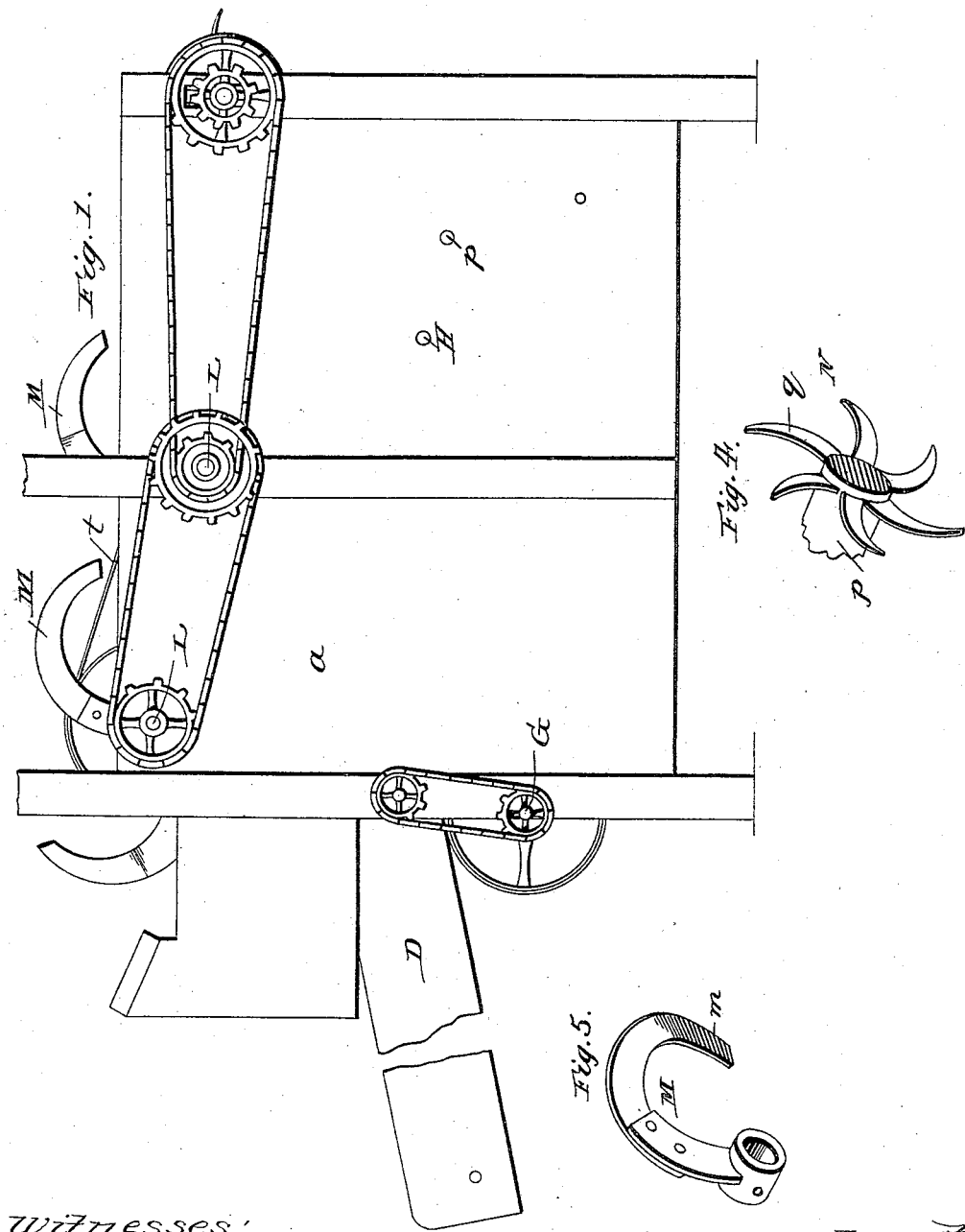

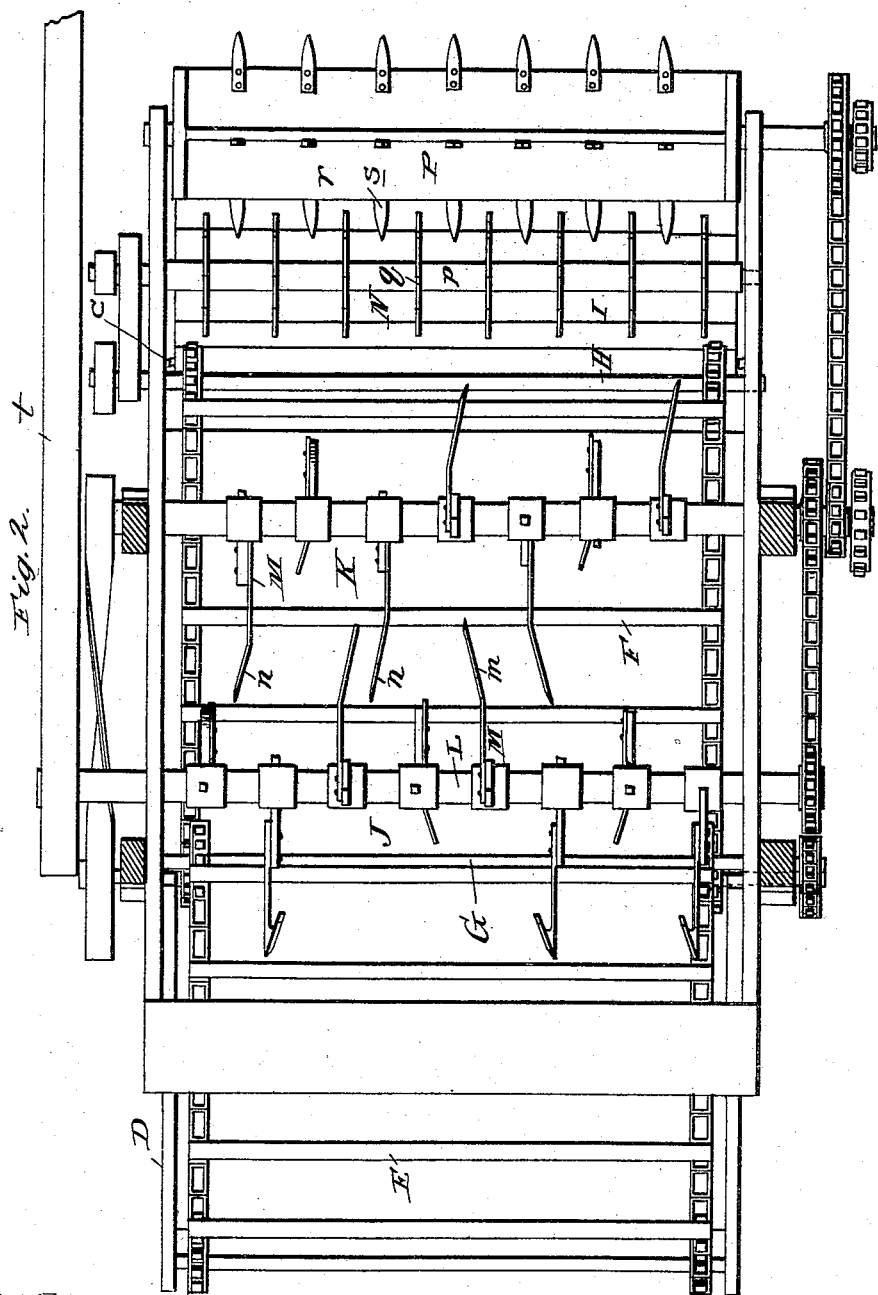

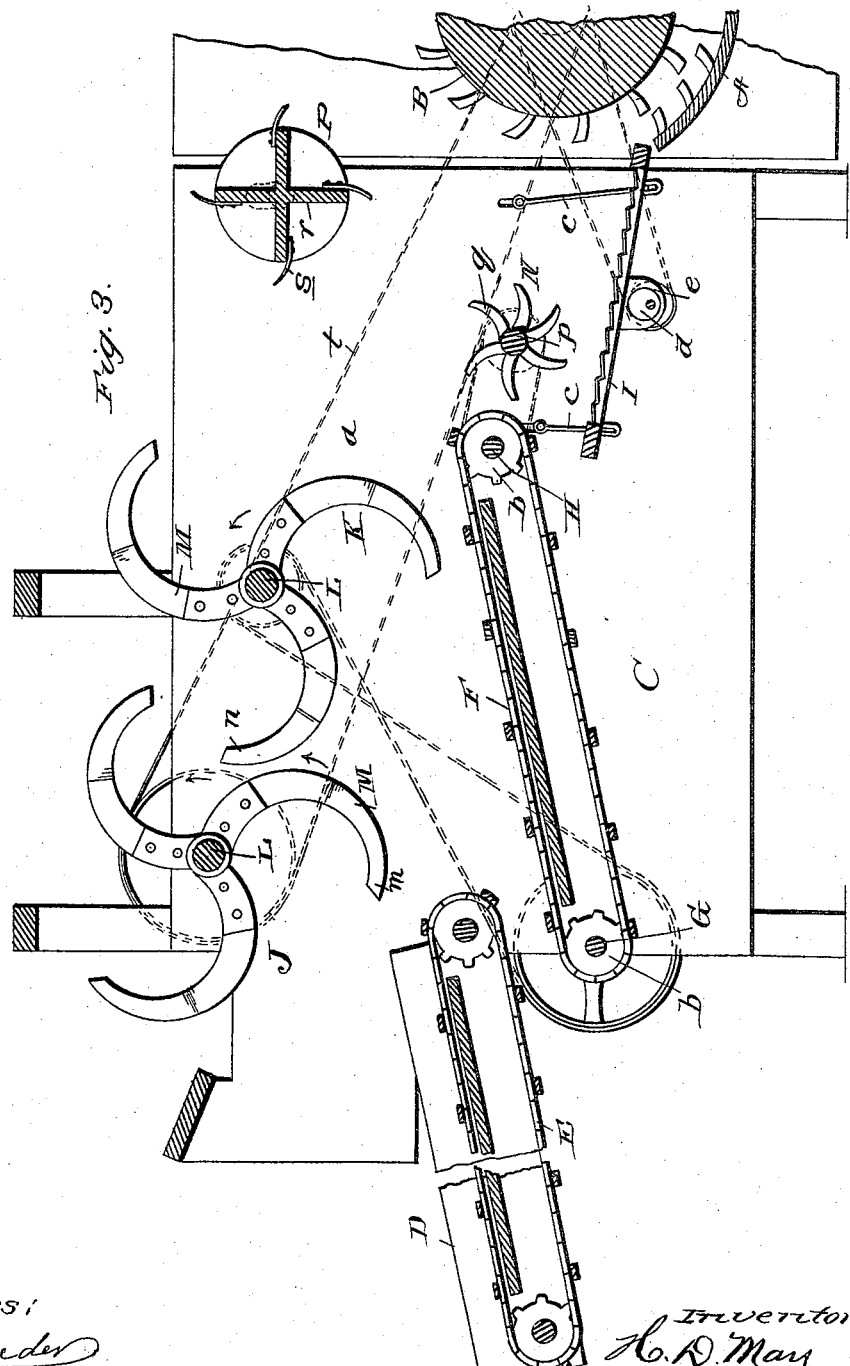

UNITED STATES PATENT OFFICE.

HARRISON D. MAY, OF LARCHWOOD, IOWA.

BAND-CUTTER AND FEEDER.

SPECIFICATION forming part of Letters Patent No. 529,397, dated November 20, 1894.

Application filed April 20, 1894. Serial No. 508,372. (No model.)

*To all whom it may concern:*

Be it known that I, HARRISON D. MAY, a citizen of the United States, residing at Larchwood, in the county of Lyon and State of Iowa, have invented certain new and useful Improvements in Band-Cutters and Feeders; and I do declare the following to be a full, clear, and exact description of the invention, such as will enable others skilled in the art to which it appertains to make and use the same.

My invention relates to improvements in band cutters and feeders, and its novelty will be fully understood from the following description and claims when taken in connection with the annexed drawings, in which—

Figure 1, is a side elevation of a band cutter and feeder embodying my invention. Fig. 2, is a top plan view of the same. Fig. 3, is a longitudinal section of the band cutter and feeder together with a portion of a thrashing machine. Fig. 4, is a detail perspective view of a portion of the rotary grain retarder. Fig. 5, is a detail perspective view of a blade of one of the rotary cutters, removed from its shaft.

In the said drawings similar letters designate corresponding parts throughout the several views, referring to which—

A, indicates the toothed concave of a thrashing machine. B, indicates the toothed cylinder which is arranged above and adjacent to the concave in the usual manner.

C, indicates the main frame or casing of my improved band cutter and feeder, and D, indicates the frame of the endless carrier E. The said frame D, and the carrier E, extend within the side walls $a$, of the casing C, as better shown in Fig. 3, and the discharge end of the carrier is preferably arranged at about the elevation illustrated in order that the secondary carrier or endless apron F, may be disposed below it. The said carrier or apron F, which takes around sprocket wheels as $b$, on the shafts G, and II, may be of any suitable construction and it extends to a point above the feed board or tray I, which is loosely connected with the side walls of the casing by the pivoted straps $c$, and is actuated through the medium of the eccentric $d$, which engages the strap $e$, upon its under side, so as to enable it to feed the loose grain, which it is designed to catch, to the thrashing machine.

J, indicates the primary rotary cutter and spreader of my improved machine which is preferably arranged above and slightly in advance of the forward end of the carrier E, and K, indicates the secondary, rotary cutter and spreader which is arranged upon the carrier or apron F, as illustrated. These rotary cutters and spreaders respectively comprise a shaft as L, and curvilinear blades M, which are arranged on the shaft in a staggering manner and have convex cutting edges so as to enable them to make a draw cut; and they are similar in construction with the exception that the blades of the primary cutter are bent at a point about midway their length and have their outer portions $m$, disposed inwardly toward the longitudinal center of the machine, while the blades of the secondary cutter are bent and have their outer portions $n$, disposed outwardly or away from the longitudinal center of the machine as illustrated. The shafts L, of the said rotary cutters and feeders are arranged such a distance apart that the blades of one cutter and spreader traverse paths quite close to the shaft of the other so as to enable the blades of the secondary cutter to engage the grain while it is yet engaged by the blades of the primary cutter; and by reason of the outer portions of the blades of the cutters being disposed at an angle to the inner portions thereof in the manner described, it will be seen that in addition to cutting the bands, the blades of the primary cutter will throw the grain toward the longitudinal center of the machine, while the blades of the secondary cutter will throw the grain outwardly. This manipulation of the grain will thoroughly divide the bundles and will turn the grain, if it is disposed transverse of the machine, and will spread the same evenly over the carrier or apron F, so as to prevent it from passing to the cylinder and concave in a thick mass. In order to further spread the grain and retard its passage to the cylinder and concave so as to prevent choking of the thrashing machine, I provide the rotary retarder or detainer N. This retarder or detainer is disposed above the feed board I, and immediately in advance of the forward end of the carrier or apron F, and it comprises the shaft $p$, and the curvilinear teeth $q$, and is preferably provided with a plurality of band wheels of different sizes as shown in order that it may be rotated at various speeds to suit different kinds and conditions of grain.

P, indicates the rotary whipper of the machine which is arranged at about the elevation illustrated above and slightly in advance of the retarder N, and preferably comprises the body $r$, and the teeth $s$, which are connected to or formed integral with the wings of the body as shown. Said whipper P, is designed and adapted to accelerate the passage of grain to the cylinder and concave of the thrashing machine, and it is preferably rotated at a greater speed than the retarder N, in order to render the feed of grain more positive.

In the practice of the invention the parts of my improved machine are rotated in the directions indicated by arrows in Fig. 3, the shaft L, of the primary cutter J, being preferably rotated from the thrashing machine through the medium of the belt $t$, and the other parts from the shaft L, through the medium of the connections illustrated.

The shaft of the rotary whipper P, may be journaled in slots or otherwise arranged so as to permit the whipper to accommodate itself to the mass of grain; and said shaft is preferably provided with a plurality of sprocket wheels of various sizes in order that its speed may be changed to suit different kinds and conditions of grain.

It will be seen from the foregoing description taken in connection with the drawings that while very cheap and simple, my improved band cutter and feeder is adapted to cut the bands and thoroughly loosen and spread the grain and regulate its passage to the thrashing machine, so as to effectually prevent choking of the same and a consequent breakage of parts.

Having described my invention, what I claim is—

1. In a band cutter and feeder, the combination of an endless apron or carrier, the primary rotary cutter arranged above said apron and having a series of curvilinear cutting blades, the outer portions of which are pitched inwardly at an angle to their inner portions, and the secondary rotary cutter arranged above the apron or carrier and in advance of the primary cutter and having a series of curvilinear cutting blades, the outer portions of which are pitched outwardly at an angle to their inner portions, substantially as specified.

2. The herein described band cutter and feeder comprising an endless carrier, an endless apron or secondary carrier adapted to receive from the endless carrier, a primary, rotary cutter arranged above the apron or carrier and having a series of curvilinear cutting blades; the outer portions of which are pitched inwardly at an angle to their inner portions, a secondary, rotary cutter arranged above the apron or carrier and having a series of curvilinear cutting blades, the outer portions of which are pitched outwardly at an angle to their inner portions, a rotary detainer arranged in advance of and slightly below the forward end of the apron or carrier and having teeth as $q$, and a rotary whipper arranged above and in advance of the detainer and having teeth as $s$, substantially as and for the purpose set forth.

In testimony whereof I affix my signature in presence of two witnesses.

HARRISON D. MAY.

Witnesses:
C. E. MAY,
H. M. MAY.